June 12, 1962 — L. I. KAPLAN — 3,038,699
NOZZLE RING ASSEMBLY
Filed Nov. 4, 1958 — 2 Sheets-Sheet 1
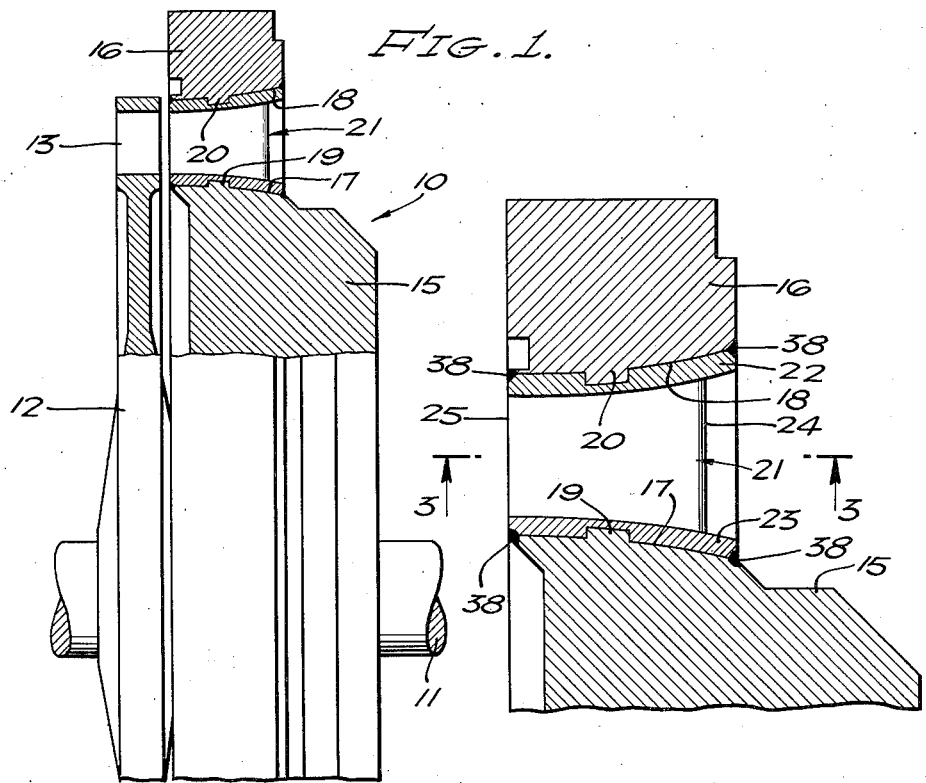
FIG. 1.
FIG. 2.
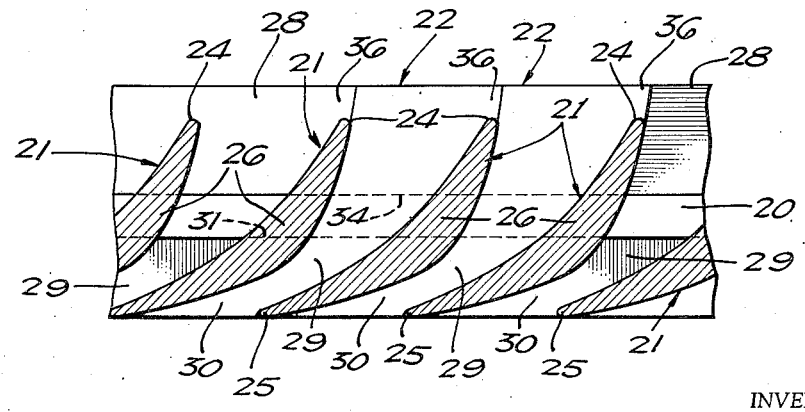
FIG. 3.
INVENTOR.
LEO I. KAPLAN
BY
ATTORNEYS

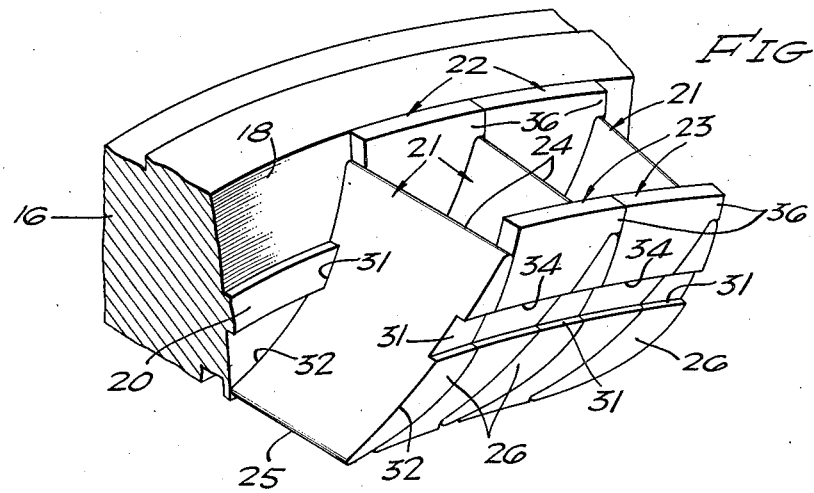
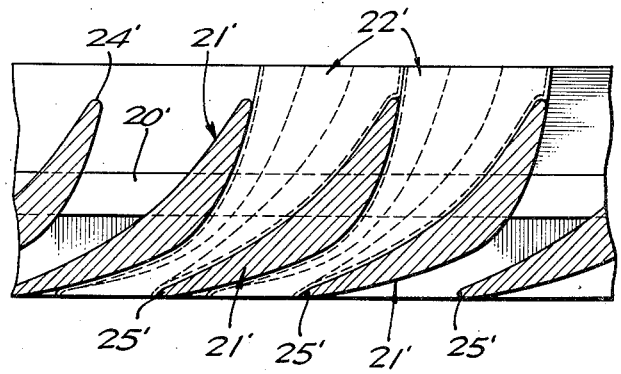
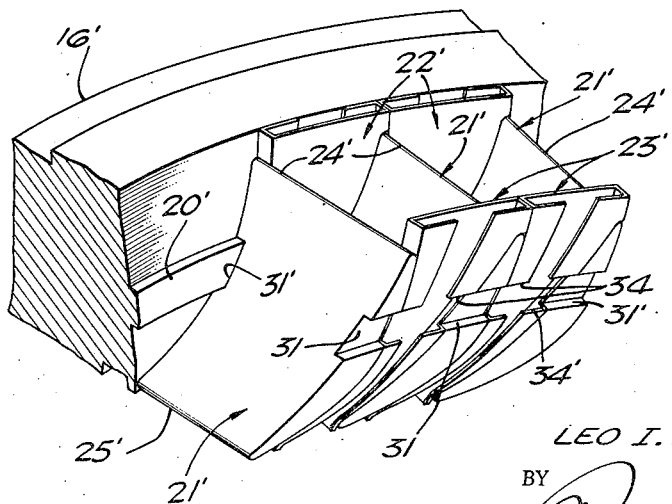

United States Patent Office 3,038,699
Patented June 12, 1962

3,038,699
NOZZLE RING ASSEMBLY
Leo I. Kaplan, Sunland, Calif., assignor to Poly Industries, Inc., a corporation of California
Filed Nov. 4, 1958, Ser. No. 771,900
12 Claims. (Cl. 253—78)

The present invention relates to fluid dynamic rotary machines and more particularly to an improved nozzle ring assembly for use in such machines and to an improved manner of manufacturing and assembling the same.

Nozzle ring assemblies are customarily employed to deliver an elastic fluid medium into the cavities formed between turbine blade buckets anchored to the rim of turbine runner wheels. It is essential that the fluid be delivered into these pockets at high velocity and in a precise direction with minimum energy loss. Desirably, the nozzles used for this purpose are of venturi-shape and disposed in an annular ring laterally of the runner rim and with the axis of the individual nozzles in a predetermined angular relationship with respect to the axis of the turbine. Many structures have been proposed heretofore having as their purpose the fulfillment of these and other objectives without entailing excessive manufacturing costs and with assurance that the dimensions of all nozzles will be as nearly identical as possible. The attainment of these objectives, however, has not been achieved satisfactorily owing to the contoured shapes required axially of the nozzle passages and the fact that these contoured surfaces must be formed to precision in high strength materials and at an angle to the opposite faces of the supporting structure. It is also important that all portions of the nozzle surfaces in contact with the fluid medium be as smooth as possible and free of abrupt changes in contour.

The foregoing and other shortcomings and disadvantages of prior constructions are obviated by the present invention in which the nozzle proper is formed by a multiplicity of pairs of simple similar components, each of which is finished to high tolerance specifications prior to assembly. These components are assembled in interlocking relation with one another and with supporting concentrically-arranged ring elements and rigidly locked in this assembled relation. Each of the two main constituent elements is preferably curved in but a single direction thereby avoiding the high costs incident to the use of compound curved surfaces and greatly simplifying the blanking of these parts as well as the final finishing of their surfaces to a high degree of uniformity and accuracy. Owing to the simplicity of the shapes employed for the component parts, these may be formed economically in various ways such as by forging, stampling, extrusion, or molding from molten or powdered metal.

Accordingly, it is a primary object of the present invention to provide an improved nozzle ring assembly wherein each nozzle is formed from pairs of similar but separate components rigidly secured together in a novel manner.

Another object of the invention is the provision of a unitary nozzle ring assembly formed from interlocking components rigidly secured together.

Another object of the invention is the provision of a nozzle ring assembly for use in a fluid dynamic rotary machine and having a plurality of fluid directing nozzles arranged in a ring and wherein each nozzle is formed by a pair of radially disposed blade elements arranged in predetermined spaced relation and locked in this position by a pair of contoured spacer elements rigidly secured to concentrically arranged mounting rings.

Another object of the invention is the provision of a nozzle ring assembly comprising a pair of concentrically arranged mounting rings held rigidly separated by a multiplicity of radially disposed contoured blade elements accurately separated in a predetermined position by spacer elements secured to the juxtaposed portions of said mounting rings.

These and other more specific objects will appear upon reading the following specification and claims and upon considering in connection therewith the attached drawings to which they relate.

Referring now to the drawings in which a preferred embodiment of the invenion is illustrated:

FIGURE 1 is a fragmentary side elevational view of a turbine runner and a nozzle ring assembly therefor, a portion of the rim areas of each being cut away to show details of the construction;

FIGURE 2 is an enlarged cross-sectional view of the nozzle ring assembly shown in FIGURE 1;

FIGURE 3 is a cross-sectional view taken along the axis of several of the nozzles and along the cylindrical surface indicated by line 3—3 on FIGURE 2;

FIGURE 4 is a fragmentary view in perspective of the nozzle ring assembly with the hub section omitted to show structural details of the nozzle forming components;

FIGURE 5 is a view similar to FIGURE 3 of a second preferred embodiment of the invention; and FIGURE 6 is a view similar to FIGURE 4 of the second embodiment.

Referring to FIGURES 1 to 4 showing one preferred embodiment of the invention, it is pointed out that the nozzle ring assembly designated generally 10 is rigidly secured to shaft 11 of any suitable type of fluid dynamic rotary machine. Also rigidly fixed to the same shaft closely adjacent one axial face of nozzle ring assembly 10 is a turbine runner wheel 12 having suitably fixed to its rim a continuous ring of bucket or turbine blades 13. The details of the latter are not shown and will be understood to be of known configuration adapted to be rotated by the impingement thereon of high velocity elastic fluid delivered along an acute angle to the face of runner 12.

The nozzle ring assembly is of primary interest and includes a high strength inner ring or mounting hub 15 and a concentrically arranged outer mounting ring 16 formed in two or more segments rigidly secured together in any known manner. The outer peripheral rim surface 17 of mounting hub 15 and the juxtaposed inner rim surface 18 of outer ring 16 may be similarly but oppositely contoured in the manner made clear by FIGURES 1 and 2 and each preferably includes a radially projecting anchoring rib 19 and 20. These ribs are preferably continuous and of low height. Although ribs 19 and 20 are shown as projecting radially beyond the rim surfaces 17 and 18, it will be understood that a similar and equally effective anchoring function may be served by replacing ribs 19 and 20 with similarly shaped grooves opening into surfaces 17 and 18. For this reason, wherever the term rib or the like is used in this specification and claims, it will be understood as including a groove and a complementally shaped surface on the nozzle components intended to be anchored in position thereby.

The nozzle components utilized to hold inner ring 15 and outer ring 16 rigidly interconnected will be best understood by reference to FIGURES 3 and 4, wherein there is shown a plurality of similar blade-like elements 21, 21 and a plurality of similar spacer plate members 22, 22 and 23, 23, the former being mounted against the inner rim surface 18 of mounting ring 16 and the latter being mounted against the rim surface 17 of hub 15. Each of blades 21 and spacers 22, 23 are preferably formed in one piece from high strength metal and are accurately finished to exact dimensions prior to assembly between hub 15 and ring 16. As is made clear by FIGURE 4, blade elements 21 have a pair of edges 24, 25 parallel to one another and form part of the radial surfaces of the respective nozzles in their assembled positions. Each of edges 24, 25 is rounded and relatively thin in comparison to the thickened midportion 26 of the blades. One suitable cross-sectional shape of blades 21 is that indicated in FIGURE 3, although it will be understood that the surface contour form no essential part of the present invention. Preferably, the blades are so contoured as to provide a wide large area entrance end or passage 28, a relatively restricted throat portion 29 and a diverging outlet passage 30.

An important feature of blades 21 is the provision along their opposite edges of grooves 31 complemental to locking ribs 19 and 20, and so disposed as to assure the assembly of the blades in accurately predetermined oriented positions relative to the opposite faces of the nozzle ring assembly. The opposite radial edges 32, 32 of each nozzle plate element is also shaped to fit snugly against and be complemental to the juxtaposed diverging rim surfaces 17, 18 of mounting hub 15 and mounting ring 16, respectively. In this manner assurance is provided that in the assembled position of the components, blade elements 21 will provide rigid radial supports for the outer mounting ring 16.

Supplementing grooves 31 and ribs 19 and 20 in holding blade elements 21 accurately positioned in the nozzle ring assembly are spacer plates 22 and 23. As herein shown, these plates are formed from solid metal of sufficient thickness to overlie anchoring ribs 19 and 20 and to cover the portions of these ribs between blade elements 21, a relationship made clear by FIGURES 1 and 2. These blades may be cast, molded, stamped or machined to size and supplement the blades in completely covering the annular rim surfaces 17 and 18 of mounting hub 15 and ring 16. Preferably these plates are of substantially uniform thickness and diverge away from one another opposite the inlet end 28 of the nozzle passages and cooperate with the contoured inlet ends of blades 21 in providing the converging inlet passage leading into the throat area 29.

As was true of blades 21, plates 22, 23 are formed with anchoring grooves 34 which are complemental to and fit snugly over anchoring ribs 19 and 20. Referring to FIGURES 3 and 4, it will be noted that one lateral edge of plates 22, 23 conforms to one surface of blades 21 whereas the other lateral edge is formed with a contoured projection 36 interfitting with the inlet edge 24 of blades 21 thereby additionally serving to anchor the blades in place as well as avoiding the presence of irregularities in the surface area of the nozzle passages.

After nozzle components 21, 22, 23 have been accurately finished they are assembled between hub 15 and mounting ring 16 element by element. After all components have been securely positioned, they are anchored in place as by welding or brazing the outer corners of spacer plates 22, 23 to the adjacent portions of the mounting rings, as is indicated by welds 38 in FIGURE 2.

A second preferred embodiment of the invention is illustrated in FIGURES 5 and 6 wherein all components will be understood as similar to those described above in the first preferred embodiment with the exception that spacer plates 22', 23' are hollow and formed from metal castings, moldings or from sheet stock in any suitable manner well known to metal working technicians. As is best shown in FIGURE 6, spacer plates 22', 23' are of channel-shape in cross-section in the interest of greater rigidity and strength. The utilization of sheet material and the described channel shape provides spacer plates which are lighter in weight and more economical to manufacture and in the use of material, without however, sacrificing the requisite strength to hold the blade elements 21', 21' properly and accurately spaced from one another. The inturned flanged edges of the spacer plates are notched as is indicated at 34' to interfit snugly with the locking ribs 20' and a second rib not shown but corresponding to rib 19 in the FIGURE 2 embodiment. It is pointed out that the components of the second embodiment are assembled in the same manner described above and the opposite ends of the spacer plates 22', 23' may be secured to the adjacent portions of the mounting rings by welding, brazing or the like.

While the particular nozzle ring assembly for a fluid dynamic rotary machine herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A nozzle ring assembly for a fluid dynamic rotary machine, said assembly being adapted for mounting in an annular radial gap between two separate and independent rigid concentric mounting members, a plurality of similarly shaped arcuate blade-like members circumferentially spaced apart having their opposite radial edges shaped to have interlocking engagement with complementally shaped opposed portions of said mounting members to either radial side of said annular gap, arcuately shaped spacer members separable from said blade-like members and positioned between the opposite ends of adjacent ones of said blade-like members, and means for rigidly anchoring said spacer members to said mounting members thereby locking the aforesaid components of said nozzle ring assembly together with the interior facing surfaces of said spacer members and of said blade-like members cooperating to form similar fluid nozzles.

2. In a nozzle ring assembly for a fluid dynamic rotary machine of the type having a pair of independently constructed concentrically arranged rigid mounting rings forming a radial gap therebetween the opposed annular surfaces of each of which are provided with interlocking means, a plurality of blade-like nozzle forming elements having their opposite radial edges shaped complementally to said interlocking means and adapted to interfit therewith to hold said elements in predetermined relation to one another in said gap, spacer plates separable from and positioned between said elements at the opposite radial ends thereof, means anchoring said plates to said mounting rings, the facing interior surfaces of said plates and of said elements cooperating to form a ring with the axes of adjacent nozzles generally parallel to one another.

3. A nozzle ring assembly as defined in claim 2 characterized in that the opposite axial ends of individual ones of said nozzles are offset from one another circumferentially of said gap.

4. A nozzle ring assembly as defined in claim 2 characterized in that said blade-like elements have relatively thin leading and trailing edges and a relatively thick midportion, said elements being assembled within said gap at an angle to the axis of said rings and cooperating with one another to form generally venturi-shaped fluid nozzles.

5. A nozzle ring assembly as defined in claim 4 characterized in that the axes of the inlet ends of said nozzles lie at an angle to the axes of the discharge ends of said nozzles.

6. A nozzle ring assembly as defined in claim 2 characterized in that said spacer plates are channel-shaped in cross-section.

7. A nozzle ring assembly as defined in claim 2 characterized in that said spacer plates are formed from sheet stock and are hollow.

8. A nozzle ring assembly as defined in claim 2 characterized in that the opposite lateral edges of said spacer plates are contoured to conform to the juxtaposed contoured surface of said blade-like nozzle elements.

9. An article of manufacture comprising a blade-like unitary nozzle-forming element for mounting radially in an annular mounting assembly of a fluid dynamic rotary machine, said element being of substantially uniform cross-section from end to end thereof and having a pair of widely spaced edges parallel to one another and a second pair of edges which flare away from one another at least adjacent one of said first mentioned edges, said parallel edges being relatively thin in comparison with the relatively thick midportion of said element, and notch means extending transversely of each of said second mentioned edges adapted to have interlocking engagement with anchor means employed in mounting said elements in predetermined spaced relationship to form fluid inlet nozzles.

10. A nozzle ring assembly comprising a circular mounting hub having an annular rim formed with rib means projecting radially therefrom, outer ring means concentric with said hub rim and having rib means projecting inwardly from its inner rim, a plurality of similar blade elements having a radial width fitting snugly between said radially spaced rims, said elements having notches forming a close interlocking fit with said ribs and shaped to conform to the surface contour of the adjacent portions of said rim surfaces, and readily insertable and removable spacer elements independent of said blade elements positioned between the adjacent ends of said blade elements and interlocking with said annular rim and with said outer ring means respectively for anchoring said elements in predetermined spaced relation circumferentially of said rims.

11. A nozzle ring assembly as defined in claim 10 characterized in the provision of spacer plates overlying and covering each of said rim surfaces between said blade elements and having smooth inner surfaces cooperating with a pair of blade elements to provide a fluid nozzle having a large area inlet converging toward a throat of relatively small cross-section.

12. A nozzle ring assembly as defined in claim 11 characterized in that each of said spacer plates is transversely recessed on its outer face to fit over and interlock with the adjacent one of said ribs.

References Cited in the file of this patent

UNITED STATES PATENTS

| | | |
|---|---|---|
| 1,998,951 | Downer | Apr. 23, 1935 |
| 2,110,679 | Robinson | Mar. 8, 1938 |
| 2,220,918 | Smith | Nov. 12, 1940 |
| 2,264,877 | Haigh | Dec. 2, 1941 |

FOREIGN PATENTS

| | | |
|---|---|---|
| 173,129 | Great Britain | Dec. 29, 1921 |
| 189,937 | Switzerland | July 1, 1937 |
| 207,310 | Great Britain | Nov. 29, 1923 |
| 619,018 | France | Mar. 25, 1957 |